Nov. 27, 1956

R. C. MACKEY 2,772,391

RECORDING MAGNETOMETRIC APPARATUS
OF THE NUCLEAR-RESONANCE TYPE

Filed Aug. 18, 1954

INVENTOR.
RICHARD C. MACKEY

BY

ATTORNEYS

INVENTOR.
RICHARD C. MACKEY
BY
Lippincott + Smith
ATTORNEYS

United States Patent Office 2,772,391
Patented Nov. 27, 1956

2,772,391

RECORDING MAGNETOMETRIC APPARATUS OF THE NUCLEAR-RESONANCE TYPE

Richard C. Mackey, Beverly Hills, Calif., assignor to The Regents of the University of California, Berkeley, Calif., a corporation of California Application August 18, 1954, Serial No. 450,648

5 Claims. (Cl. 324—.5)

This invention relates to magnetometric apparatus for registering, and, preferably, recording, the strengths of varying magnetic fields to accuracies of the order of a fraction of a gauss.

Research in nuclear magnetism has led to the necessity of determining the behaviour of atoms of various kinds in magnetic fields of known intensity. In order to derive the information required in a form which will give it its maximum utility it is highly desirable that the data obtained should show the behaviour of the specific characteristic under investigation as the field strength approaches, passes through, and departs from certain critical values, and that the absolute magnitude of the fields at the values should be known to a very high degree of accuracy. Magnetometers or flux-meters of the nuclear-resonance type, either the absorption type, as developed by Purcell and Pound, or the magnetic induction type, as developed by Hansen, are capable of indicating magnetic field strengths to the degree of accuracy desired; instruments of both characters are available on the open market.

Both instruments operate by superimposing on the field to be measured a cyclically varying magnetic field. A probe, containing a sample of some material whereof the proton-resonance characteristic is known, is subjected to the joint effects of the field to be measured and the cyclically varying field added thereto. The instrument gives an indication when the cyclically varying field sweeps through a point of nuclear resonance to a known frequency. If the field strength proper to that frequency is that of the measured field alone, the indications are given as the strength of the superimposed field passes through zero, and the resultant pulses are equally spaced. If the known frequency is off-tune the spacing of the pulses is shifted, although their average frequency of recurrence remains the same; the pulses will then occur in groups of two, with increasing spacing between the pairs of pulses as the field strength and the known frequency with which it is desired to compare it depart further and further from the resonance value.

Although instruments of this character are of extreme delicacy and accuracy, measurements of the type which it is desired to make with them become extremely laborious, since the properties to be investigated must be plotted out by the point-by-point method. Observations must be made of the exact resonance frequency corresponding to a given field to be measured, and these must be correlated with observations on the other data relating directly to the test being made, since not only the field strength but the response of the material under test to that field strength must be simultaneously recorded. So many parameters must be observed at the same time that the observations become extremely difficult if not actually impossible.

It follows from the brief description of the nuclear-resonance type of magnetometer given above that the measurement of field strength is made in terms of the frequency of response of a tuned circuit, and, as is known, such response frequencies can be measured with extreme accuracy. The primary indication of meters of this character is the relative position of the response peaks, which shows when the frequency of the resonant circuit including the sample tested corresponds to the value of the measured flux alone, without the superposed sampling component; this is merely an index of the point at which a reading is to be taken, however, and the measurement of flux becomes the measurement of the resonant frequency of the circuit itself.

Among the objects of the present invention are to provide a registering magnetometric apparatus which is, essentially, self-tuned to the intensity of magnetization to be measured, so that field intensity can be read directly from the resonant frequency of the tuned circuit; to provide apparatus of the type described which will follow a continuously varying magnetic field, giving either constant indications of the field strength, or, alternatively, giving indications of the field strength as it passes through definite, spaced values on a recording chart, on which the other parameters to be measured are simultaneously recorded, thus converting the coordinates of time on the chart to coordinates of magnetic intensity; to provide a meter of the character described which will give indications to substantially the degree of accuracy of which the nuclear resonance method is capable, without the laborious manipulation required by other methods.

Considered broadly, the present invention comprises the combination, with a nuclear resonance flux-meter of known type, of additional apparatus comprising a two-phase servomotor connected to tune the resonant circuit of the meter. One phase winding of the servomotor is supplied with current of the same cyclic frequency as that superposed upon the magnetic field to which the sampling probe is subjected. The second phase winding is supplied with the output pulses of the meter. When the resonant circuit of the meter is tuned to resonance with the exact value of the flux to be measured, the meter output circuit supplies a pulse each time the superposed flux passes through zero, resulting in an output wave having no component of the fundamental frequency of the cyclic variation in magnetization. If the resonant circuit is tuned to a frequency on either side of the nuclear resonant frequency, the paired pulses establish, in addition to the double frequency component, a fundamental component the magnitude whereof varies as a function of a departure of the oscillating circuit frequency from the nuclear resonant frequency corresponding to the strength of the field to be measured, and whose phase depends upon the direction of the mistuning of the oscillating circuit, whether it be higher or lower than that corresponding to the resonance. When the output signal from the meter is amplified and fed into the second phase coil of the servomotor the latter will accordingly rotate in the proper direction to bring the meter into tune.

In making measurements of the type for which the invention is particularly adapted (although this is not the only manner in which it is adapted to be used) the current supplied to an electro-magnet which develops the field to be measured is continuously varied at a known rate. Under these circumstances the magnetometer will follow the variation in the field and remain in tune throughout the variation in field strength and its frequency as it varies can be registered, for example, on a radio frequency meter of known type. For the purpose herein especially considered, however, it is desirable that the frequency be not only registered but that its variation be recorded. In accordance with a preferred embodiment of the invention means are provided for making such a record, the device being designed to give indications which can be inscribed upon the chart of a multiple-pen recorder of commercial type together with the other parameters to be measured and with which the field strength is to be correlated. Specifically, in the preferred form of the invention, there is provided a standard-frequency generator supplying oscillations of a known and constant frequency. These oscillations are used to drive a harmonic generator, such as a multivibrator or clipping amplifier, which will develop multiple harmonics; i. e., a large number of frequencies spaced at regularly recurrent intervals each equal to the fundamental frequency of the standard frequency generator. A wave of the frequency to which the meter is tuned, suitably amplified, is fed to an intermodulator or mixer circuit together with the harmonic-rich waves from the harmonic generator. The resultant modulation products are fed to a low pass filter designed to pass only frequencies of a few cycles per second. The filter may be a passive, wave filter, in which case it is followed by an amplifier; preferably, however, the filter is of the dynamic type, including within itself the amplifying equipment. As the frequency supplied by the magnetometer sweeps through the various harmonic frequencies, frequencies will be developed at each harmonic, as zero beat is approached, which will pass and be amplified by the low pass network. These frequencies may then be applied to actuate a pen of the recorder; for example, the pulse of low frequencies may be rectified and applied to trigger a thyratron or grid-glow tube and thus apply a pulse to actuate the recording pen.

In the accompanying drawings, illustrating the invention as utilized in making tests of the type herein described:

Figure 1:
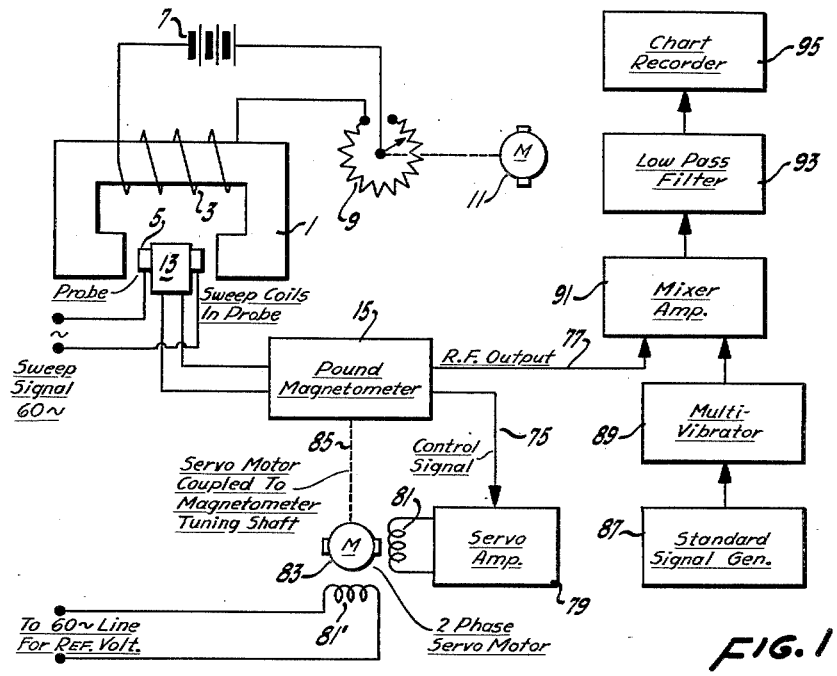
Fig. 1 is a diagram, largely in block form, of a preferred form of the invention as used to record the magnetic field intensity during a test run.

Considering first Fig. 1, there is shown, at the top of the drawing, a set-up of one type wherein the present invention finds utility. There is shown an electro-magnet, comprising a core 1 and a coil 3 for providing a magnetic field in an air gap 5, the intensity of which field is to be measured. The winding 3 is supplied with exciting current from a suitable source, illustrated as a battery 7, through a potentiometer 9 having a moving contact which is continuously and slowly driven by a motor 11.

In the case of an actual test it is probable that a much more elaborate arrangement would be used to insure that the strength of the magnetic field in the gap 5 increased slowly and linearly, since a characteristic run of this character will usually consume a period of the order of five minutes, although it may, of course, consume longer or shorter periods. Since the equipment used for conducting the test, like the test itself, is not a portion of the present invention, the highly schematic showing is considered to be adequate for the purpose. It may be added that although a variation in field strength which is strictly linear with time is not a fundamental requirement for utilizing the equipment here described it will usually facilitate the tests to be made. The sensitive element or probe 13 of the magnetometer 15 is inserted in the field to be measured in the air gap 5.

Figure 2:
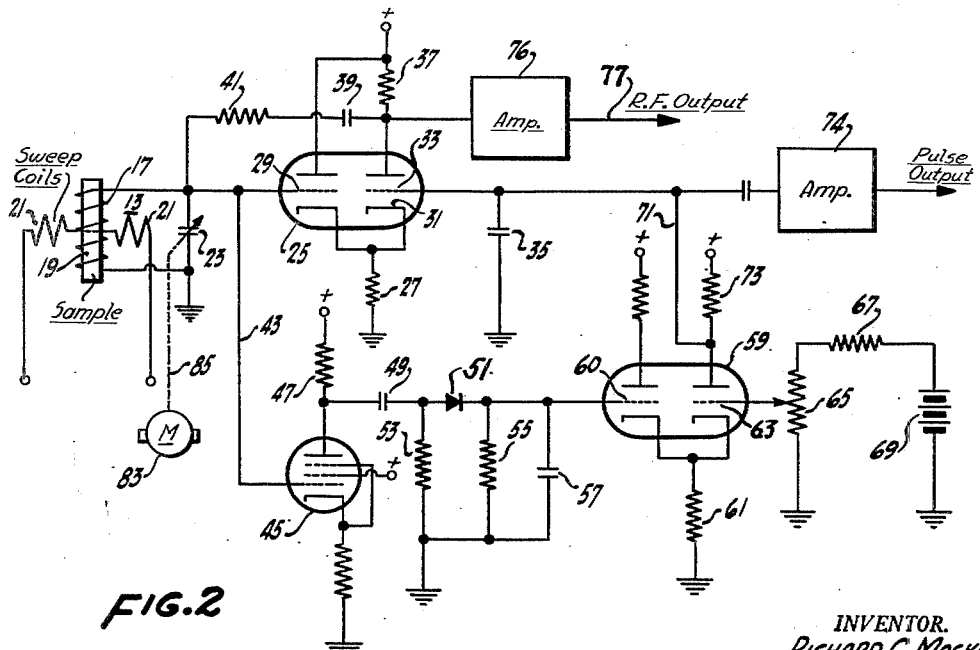
Fig. 2 is a schematic diagram illustrating, in simplified form, the circuit of a nuclear-resonance magnetometer of one type which is suitable for use in combination with the present invention.

Although the meter and the probe are old elements, which are not claimed herein, a simplified diagram of their connections is shown in Fig. 2 in order that the operation of the invention itself may be better understood in connection therewith. The probe itself comprises a coil 17 which surrounds a sample 19 of a material adapted to exhibit the phenomenon of nuclear resonance. In the majority of cases this will be a small glass vial containing water, as this is the most available substance containing hydrogen nuclei. Hydrocarbons, such as paraffin wax, can be used for the same purpose and for the same reason, and lithium and various other substances exhibiting like phenomena can also be used, but in the explanation which follows it will be assumed that the resonance of the hydrogen nucleus is that which will be used for the measurement of the field intensity.

Mounted within the probe, and with their axes normal to the axis of the coil 17, a pair of sweep coils 21 is mounted. These coils carry an alternating current of relatively low frequency; the usual 60 cycle frequency of commercial power circuits is quite suitable for the purpose and it is assumed in the set-up of Fig. 1. The current supplied to the sweep coils is sufficient to vary the strength of the magnetic field to which the sample is subjected through a small range; typically, somewhere in the neighborhood of 10 gauss, in measuring a field intensity such as would be supplied by the magnet 1, which may be, for example, several thousand gauss.

Bridged across the coil 17, within the case of the meter 15, is a variable condenser 23, so that the coil 17 together with the condenser form the frequency-determining or tank circuit of a variable frequency oscillator. Such an oscillator comprises a dual triode 25, the sections of which have a common cathode resistor 27. The grid 29 of the first section is connected to the ungrounded side of the tank circuit, and the anode of this section connects directly to a conventional source of space current, not shown, so that at radio frequency the anode is effectively at ground potential. The cathode 31 of the second section of this tube is coupled through resistor 27 with the cathode of the first section. The grid 33 of the second section connects to ground through a radio-frequency bypass condenser 35, the variation in potential between cathode and grid resulting in a variation of space current through this section of the tube, causing a radio frequency voltage to appear across an anode resistor 37. This voltage is applied through a blocking condenser 39 and resistor 41 back to the grid 29 giving necessary feedback to cause the circuit to oscillate.

The oscillating potential of the grid 29 is taken off through a lead 43 and applied to the grid of an amplifier tube 45. The amplified signal, as developed across anode resistor 47 of the tube 45, is applied through a blocking condenser 49 to a conventional detector circuit comprising a rectifier 51, both sides of which are shunted to ground by resistors 53 and 55. A condenser 57 connects across resistor 55, the combination having a time constant within the audio-frequency range.

The detector circuit connects to one grid 60 of a difference amplifier comprising a dual tube 59, both cathodes whereof connect to ground through a resistor 61. The grid 63 of the second section connects to a movable contact of the potentiometer 65, which forms a part of a voltage divider including a resistor 67, and a source of constant potential 69. A connection 71, from the anode of either section of tube 59, applies the potential developed across the anode resistor 73 to the grid 33 of the oscillator tube 25.

The circuitry between the connection 43 to grid 29 and 71 to grid 33 comprises a feedback loop which tends to keep the radio frequency output of the oscillator at a substantially constant level. When the hydrogen nuclei within the sample 19 are subjected to a magnetic field which brings them into resonance with the frequency to which the amplifier is tuned by the condenser 23, they absorb power from the oscillating circuit and therefore tend to decrease the amplitude of the oscillator output. Such reduction tends to decrease the rectified signal through the rectifier 51, appearing on the grid of the differential amplifier 59 and therefore varying the drop across resistor 61. The cathode of the second section of tube 59 follows the potential of the first cathode, changing the potential difference between the second cathode and the grid 63 and therefore the drop across resistor 73.

The variation in voltage drop in this resistor is applied to grid 33 of the oscillator tube. In the present instance it makes this grid more positive and increases the signal passed by the second section of tube 25, and thus brings the oscillator back to its original signal level. What this level may be can be adjusted by means of the potentiometer 65.

The resonance frequency of the hydrogen nucleus undergoes a change of 4257.67 cycles per second per gauss change in magnetic field intensity. Since the sweep frequency applied to the coils 21 changes the intensity of the field to which the sample is subjected through a range in the neighborhood of 10 gauss, if it is assumed that the oscillator frequency is within the range through which the field intensity is swept, the sample will pass through the resonant condition twice in each cycle. Therefore, twice in each cycle, the current passed by the differential amplifier and hence the drop across resistor 61 will increase (or decrease) resulting in a voltage pulse whose shape is that of the familiar resonance curve of an oscillating circuit. As the nuclear-resonance is very sharp, these pulses will be brief. They are taken off through an amplifier 74 and supplied as the pulse output of the meter 15 through a lead 75. The other, radio frequency output, is taken from across the resistor 37 through a buffer amplifier 76 feeding lead 77 and the other elements of the invention to be described below.

As meters of this character are customarily used, the pulse output is observed on an oscilloscope and the condenser 23 is manually adjusted until the spacing between the pulses is uniform. This occurs when the sample becomes resonant to the oscillator frequency when it is subjected to the measured field alone at the instants when the sweep field passes through zero. When the frequency of the oscillating circuit is somewhat above the nuclear resonance frequency in the field to be measured, instead of occurring at the zero of the sweep field the pulses will occur during the two intervals of the half of the cycle when the sweep field, aiding the measured field, pass the sample through the resonant frequency; hence two pulses will occur more closely together in the "positive" half of the sweep-field cycle, none occurring in the negative half of the cycle. If the oscillator is tuned too low, both pulses will occur in the negative half of the cycle. In either case an analysis of the pulse output will show a component of the fundamental sweep frequency in the resulting current or voltage, this fundamental frequency component reversing in phase as the tuning passes through the desired, resonant frequency. Further, it will be seen that this fundamental frequency component disappears, leaving only even harmonics of the sweep frequency in the pulse output, when the meter oscillator is exactly tuned.

Returning to Fig. 1, the pulse output from the meter is supplied through the lead 75 to a servo amplifier 79, which is preferably so designed as to filter out the harmonic content of the pulsed control signals, although this is not strictly necessary.

The amplified signals of the fundamental sweep frequency are supplied to one phase coil 81 of a servomotor 83, which is coupled, through a shaft 85, to turn the tuning condenser 23 of the magnetometer 15. The other phase coil 81' of the servomotor is supplied with the 60-cycle line frequency which also supplied the sweep coils. Accordingly, the servomotor will rotate in one direction or the other whenever there is a fundamental sweep frequency in the meter output, and the connections are arranged so that this rotation will tend to bring the meter into tune. Since, in the present illustration, the field to which the probe is subjected is constantly varying at a substantially constant rate, the servomotor 83 will also rotate constantly throughout the test, following the field variations as closely as may be desired, although always lagging very slightly behind. In practice this lag may be that corresponding to only a small fraction of a gauss. With the magnetometer thus maintained constantly in tune, the frequency of its radio frequency output, through its lead 77, becomes a measure of the field intensity within the gap 5, since it is directly proportional thereto.

It remains to translate these signals into a form which will supply a running register of the variations in field intensity. Direct reading frequency meters are available on which the frequency supplied may be registered, in terms of either frequency or magnetization. Preferably, however, the signals are registered in such form as may be recorded by a curve-drawing recorder of conventional type, to permit correlation with a record of whatever other quantities are under test. Such recorders are customarily clock-driven, and plot the quantity to be measured as it varies with respect to time. The most useful form in which the data supplied by the radio frequency output of the meter can be recorded is therefore usually in the form of a scale which converts the fundamental time scale of the recorder into a scale of magnetic intensity. Various commercially available recorders are provided with additional pens or styli with which time markers or the like can be imposed upon the record as a supplement to the time scale provided on the charts, and the equipment illustrated is that adapted to utilize such a marker pen in a scale reading or convertable directly to field intensity.

There is provided a standard-signal generator 87, preferably crystal controlled and stabilized to maintain a constant frequency output to a high degree of accuracy. Such standard generators are commercially available from numerous sources, and frequently are supplied with crystals ground to frequencies of integral powers of ten, although other frequencies are obtainable. The frequency chosen for the oscillator will depend upon the graduation desired for the magnetometric scale to be marked on the record. It has already been mentioned that the resonant frequency of the hydrogen nuclei varies by a factor of 4257.67 cycles per second per gauss, this figure being known as the gyromagnetic ratio. This is equivalent to 0.0002349 gauss per cycle. The spacings of the graduations of the magnetometric scale will be equal, in gausses, to this later figure multiplied by the oscillator frequency; if a standard 10-kc. oscillator is used the scale spacings would be 2.349 gauss apart, while 100 kc. standard oscillator will give 10 times this scale spacing or 23.49 gauss. If 10 gauss scale spacings are desired, the standard signal generator should be provided with a crystal having a fundamental frequency of 42,576.7 cycles per second, assuming the usual water sample.

The standard-frequency signal is supplied to a harmonic generator, indicated as a multivibrator 89, but which might be any other form of apparatus which will give an output waveform which is rich in harmonics. The substantially square wave output of the multivibrator satisfies this requirement. A well known alternative, also yielding substantially square waves, is a clipping amplifier. Any type of device which will give a continuous series of harmonics, spaced by the fundamental frequency of the standard oscillator, will serve the purpose, the multivibrator being merely one which is well known in the art, which will synchronize upon the frequency of the supply circuit and which is simple and convenient.

The harmonic-rich signal derived from the standard-signal generator is supplied to an intermodulator or mixer-amplifier 91, together with a radio frequency signal through the lead 77 from the magnetometer. The mixer circuit may conveniently be of the type which is used in the vast majority of radio receivers to heterodyne the received signal down to a frequency which can be conveniently handled by an intermediate frequency amplifier, but any type of modulating circuit which will develop a difference frequency between two incoming signals may be employed. The fact that such devices will also yield a sum frequency signal is of no moment for the present purposes, since all undesired frequencies are filtered out, as will be described immediately hereinafter. Other types of vacuum tube modulators, crystal diode modulators, ring modulators, etc., may be employed, but the mixer circuit has the advantage of simplicity and of giving a certain amount of amplification, rather than loss, in the intermodulation process.

Figure 4:
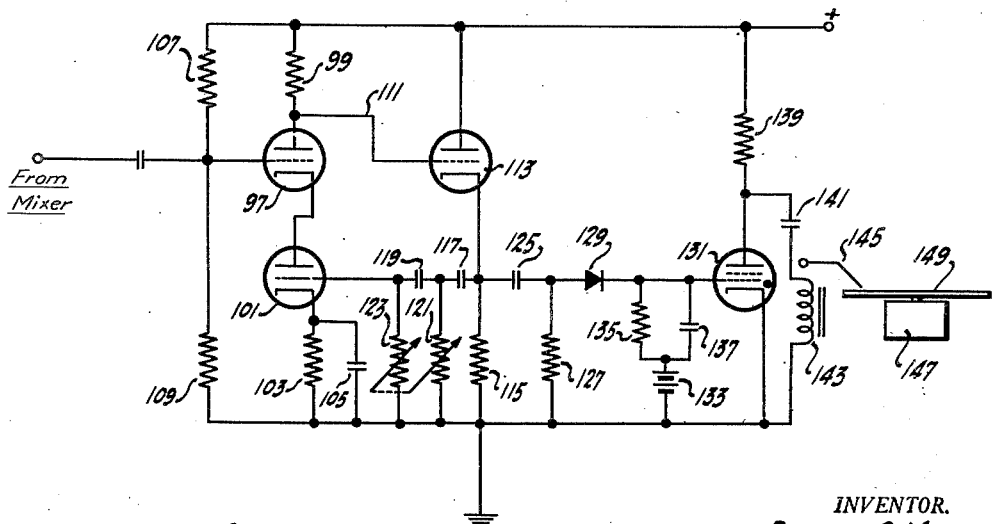
Fig. 4 is a schematic diagram showing one form of low pass and recording network.

The modulation products from the mixer are supplied to a low pass network 93, amplified, and supplied to a graph-drawing recorder as indicated by the block 95. One form of the equipment illustrated by the blocks 93 and 95 is illustrated in schematic form in Fig. 4. In this figure the lead from the mixer circuit 91 is shown as connected to the grid of a triode 97, this triode being connected in series between an anode resistor 99, connecting to the usual form of anode supply, and a second triode 101. The cathode of the latter connects to ground through the usual cathode resistor 103, bypassed by a condenser 105. A voltage divider comprising resistors 107 and 109, connected between the positive side of the anode supply and ground, provides the proper operating potential for the grid of tube 97 with respect to its cathode. A lead 111 connects directly from the anode of tube 97 to the grid of another triode 113, connected as a cathode follower, its cathode connecting to ground through a resistor 115. The variations in potential drop across the cathode resistor of tube 113 are fed back through a two-stage, high pass, capacity-resistance filter, comprising series condensers 117, 119, and mechanically interconnected variable resistors 121 and 123 to the grid of tube 101. This arrangement provides substantially a one-hundred percent negative feedback of the higher frequencies supplied to the amplifier tube 97, but zero feedback for direct current and very small feedback for lower frequencies, the cut-off point being adjustable by variation in the value of resistors 121 and 123. In practice it is convenient to set these resistors so that the arrangement cuts off at a frequency in the neighborhood of 30 cycles, although a lower frequency cut-off could be used if more accurate readings were required.

The cathode of tube 113 is coupled, either directly or through a very large coupling condenser 125, which will pass frequencies well below cut-off value of the amplifier, to a detector circuit comprising a shunt resistor 127 and a series rectifier 129. The output side of this rectifier connects to the control electrode of a thyratron or grid-glow tube 131. The grid is negatively biased to cut-off by a battery or other source 133 which connects to the grid through a high value resistor 135 shunted by a condenser 137. The anode of tube 131 connects to the common anode supply through a resistor 139. A condenser 141 also connects to the anode of the thyratron, its other side being connected through the coil 143 of a magnet which actuates the pen 145 of the conventional recorder, which is illustrated merely as a suitable clock motor 147 driving the disc 149 which carries the chart upon which the record is to be made.

As the radio frequency output from the meter 15 is gradually varied, it will sweep, in succession, through all of the multiple harmonic frequencies developed by the harmonic generator 89. As it approaches and passes each of these frequencies there will develop in the mixer circuit frequencies which will pass through the low pass network 93. If the cut-off frequency of the latter is 30 cycles, the first frequencies to be passed by the tube 113 to the rectifier 129 will be of about this frequency, whereafter they will fall to zero and then rise to a point where they are no longer passed by the low pass network, the next signal to be passed being generated as the frequency developed by the magnetometer passes through the next harmonic. When a signal is developed which will pass the low pass network it is rectified by the element 129 to produce a positive charge on condenser 137, which overcomes the bias supplied by the battery 133, and thus triggers the thyratron 131.

The voltage on the anode of the thyratron is that which is available across the condenser 141, and the value of resistor 139 is so chosen that the time-constant of the combination of the resistor with condenser 141 is relatively long in comparison with the time required for the magnetometer signal to pass through the range of frequencies which will result in signals passing through the low pass network; i. e., through the "zero beat" range with respect to any other harmonics of the standard frequency generator. Triggering of the thyratron by a signal from the low pass network and detector circuit effectively closes the circuit including the magnet coil 143 and the condenser, resulting in a "dumping" of the condenser and a pulse through the magnet coil, actuating the pen instantaneously. After this has occurred the drop through the resistor 139 is too great to maintain the discharge through the thyratron, which accordingly cuts off. The condenser 141 then gradually recharges to a value which will activate the thyratron the next time it is triggered.

Theoretically the value of the frequency which it is desired to record as a marker on the chart is that which is developed exactly as the magnetometer frequency passes through zero beat with each harmonic, and it will be seen that, assuming the low-pass network cuts off at 30 cycles, the record will be made approximately 30 cycles before the magnetometer frequency reaches its exact value. This, however, represents an error of only about 0.007 gauss. Furthermore, the servo mechanism controlling the meter will always lag behind the exact tune by an amount of something of this order, and any error which is introduced is not only extremely small, but is, in fact, a compensating error. The triggering impulse will always arrive as the oscillator frequency is approaching the exact zero beat value, and the time constant of the thyratron circuit is too long to permit the tube to fire again before the beat frequency has passed entirely beyond the triggering range.

If the variation in magnetic field to be measured is strictly linear, the magnetometric scale inscribed by the device upon the chart will also be linear. If, however, there are nonlinearities in the exciting current of the magnet, the magnetometric scale will be nonlinear, but if the device is so arranged that the indications are made at sufficiently frequent intervals, the magnetomeric scale can easily be interpolated to give the true values of the magnetization corresponding to the various points on other graphs traced by the recorder.

The lower the fundamental frequency of the standard frequency generator, and hence the closer the graduations of the magnetometric scale, the higher will be the order of harmonics required to give an indication of a specific magnetic value. In practice it has been found convenient to use a fundamental standard frequency in the neighborhood of 100 kc., giving a spacing of the graduations in the neighborhood of 23 gauss. To give a scale spacing of 25 gauss per graduation requires a fundamental frequency of 106,441.75 cycles per second for the standard frequency. Within this range it has not been found necessary to use special equipment in order to get clear-cut responses in the measurement of fields of the order of 3000 gauss, corresponding to magnetometer-oscillator frequencies in the neighborhood of 14 mc. If it were necessary to measure intensities so great that the harmonics, corresponding to a desired scale, became too weak for ready identification, there are various well known expedients for obtaining similarly spaced harmonics in higher frequency ranges. For example, the harmonic output can be raised in the frequency scale by heterodyning, or other modulation processes well known in the art may be used to develop the marker frequencies. Since such expedients are generally known and not ordinarily required it has not been considered necessary to illustrate them.

Figure 3:
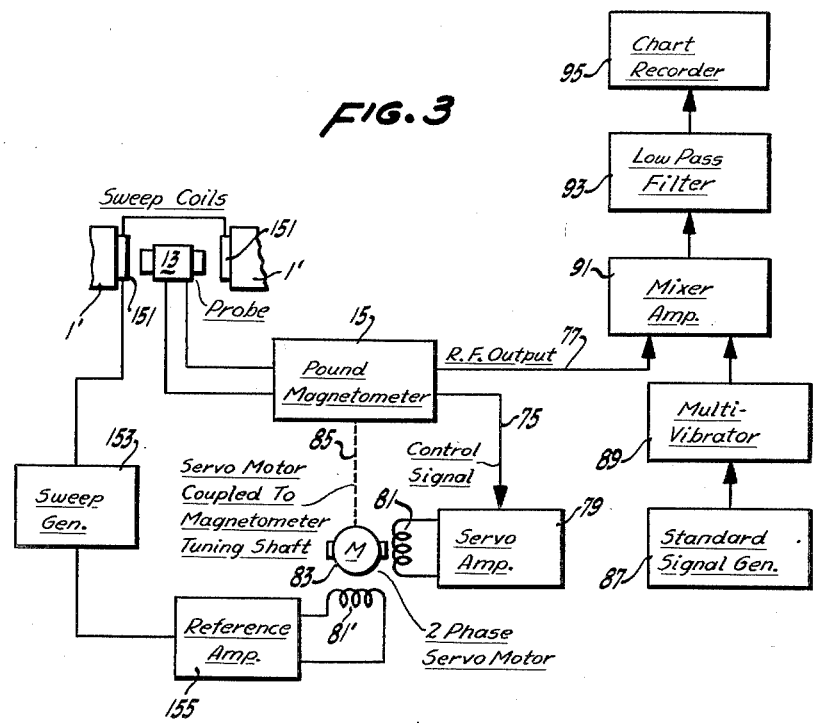
Fig. 3 is a block diagram illustrating certain modifications of the arrangement shown in Fig. 1.

In Fig. 3 there is shown a slight modification of the arrangement illustrated in Fig. 1 which possesses certain advantages for some purposes. In this case only the poles of the magnet 1' are shown, since the other equipment relating to the magnet may be identical with that shown in Fig. 1. The difference in the magnet set-up is that it is the entire field of the magnet which is cyclically varied. Auxiliary coils, 151, are mounted on the pole pieces of the magnet to carry the cyclically varying current and the sweep coils in the probe 13 are simply left disconnected.

Current for exciting the sweep coils is supplied from a sweep generator 153. It is sometimes an advantage to make this generator operate on a frequency which differs somewhat from that supplied by the usual power line, although, if standard types of servomotor are to be used the frequency of the generator is preferably kept within the same general range, 85 cycles having been used in one embodiment of the invention which has been tested. The frequency from the sweep generator is also fed to a reference amplifier 155 which raises the power to that necessary to supply coil 81' of the servo. Otherwise the arrangement is identical with that shown in Fig. 1, and the various elements of the combination are designated by the same reference characters as those used in the first figure.

It will be seen that the arrangement of Fig. 3 embodies two modifications over that of Fig. 1. The first is the use of independent sweep frequency coils, and whether or not this is advantageous depends upon the particular test in which the instrument is used. In general, it will take more power, for the whole field must be varied instead of the small portion thereof which threads the probe. The second is the use of a frequency which departs from that of the power-supply which will, normally, be used to provide the necessary operating power for the instrument as a whole. This reduces the hum problem and decreases the interference which may be caused by noise entering into the system by induction from the power line. The apparatus has been used successfully in both ways, but while the use of a sweep generator of a frequency which differs from the power supply requires additional apparatus, the lower noise value resulting from the use of a frequency differing from that of the supply is a definite gain which may, in many embodiments, result in sufficient improvement to warrant the relatively small additional complication.

Because of the very small energy available from the probe, and because, therefore, the changes in energy from the meter oscillator must be small and the amplitude of the oscillator must also be small in order that such small changes may be recognized, it might be thought that circuit noise would be so important a factor as to interfere with the over-all operation of the apparatus and to make its readings indeterminate. That this is not so depends, in a considerable degree, upon the very narrow pass band of the network 93. It is well known that the noise in circuits of this character is a direct function of the width of the band in which it occurs, thermal noise in particular being random and having a spectrum of practically constant energy throughout its width. Because the pass band of the network 93 is only a few cycles wide it is only affected by that portion of the noise spectrum which lies in the very low frequencies and therefore noise has not proved to be a serious problem in the operation of the apparatus.

While the apparatus has been shown as embodying a Pound magnetometer and it is the essential circuits of such a magnetometer that have been described in detail in order to explain the operation of the equipment specific to this invention, the apparatus associated with the magnetometer proper may be practically identical with that shown and described even if a magnetometer of the induction type is used instead. The invention, therefore, is not intended to be limited to the combination including a magnetometer of the Pound or absorption type, nor have the detailed descriptions of other elements been intended to limit these elements to those specifically described. These descriptions have rather been intended as illustrative of the principles of operation of the apparatus and of specific forms which are generally suitable for the use prescribed, all intended limitations being specifically expressed in the following claims.

What is claimed is as follows:

1. Registering magnetometric apparatus for giving a continuous train of indications of the strength of a varying magnetic field which comprises the combination, with a nuclear-resonance magnetometer operative to vary the value of an electric current as the magnetic field strength to which a sample is subjected is swept, through the value causing resonance in the sample to the frequency developed by an oscillator, by a cyclically varying magnetic field superposed on the field to be measured, of a servomotor mechanically connected to vary the tuning of said oscillator and having one phase winding supplied with a reference current of the frequency of said cyclically varying field, and a second phase winding supplied by the varied current from said magnetometer, whereby said oscillator is automatically tuned to the nuclear resonance frequency of said sample in the field to be measured, and frequency-responsive means for registering the frequency to which said oscillator is tuned.

2. Registering magnetometric apparatus for giving a continuous train of indications of the strength of a varying magnetic field which comprises the combination, with a nuclear-resonance magnetometer operative to vary the value of an electric current as the magnetic field strength to which a sample is subjected is swept through the value causing resonance in the sample to the frequency developed by an oscillator, by a cyclically varying magnetic field superposed on the field to be measured, of a servomotor mechanically connected to vary the tuning of said oscillator and having one phase winding supplied with a reference current of the frequency of said cyclically varying field, and a second phase winding supplied by the varied current from said magnetometer, whereby said oscillator is automatically tuned to the nuclear-resonance frequency of said sample in the field to be measured, a standard-frequency generator, means for developing multiple harmonics of the frequency produced thereby, means for intermodulating said oscillator frequency with said harmonic frequencies, and registering means supplied by said intermodulating means and responsive only to difference frequencies in the output thereof of less than a selected value.

3. Registering magnetometric apparatus for giving a continuous train of indications of the strength of a varying magnetic field which comprises the combination, with a nuclear-resonance magnetometer operative to vary the value of an electric current as the magentic field strength to which a sample is subjected is swept through the value causing resonance in the sample to the frequency developed by an oscillator, by a cyclically varying magnetic field superposed on the field to be measured, of a servomotor mechanically connected to vary the tuning of said oscillator and having one phase winding supplied with a reference current of the frequency of said cyclically varying field, and a second phase winding supplied by the varied current from said magnetometer, whereby said oscillator is automatically tuned to the nuclear-resonance frequency of said sample in the field to be measured, a standard-frequency generator, means for developing multiple harmonics of the frequency developed thereby, means for intermodulating said oscillator frequency with said harmonic frequencies, low pass filtering means supplied by said intermodulating means, a recorder of the type which continuously moves a coordinate-bearing chart at a constant rate and is adapted to record an indication on said chart in response to an actuating signal, and means responsive to frequencies passed by said filtering means for supplying an actuating signal to said recorder.

4. Magnetometric apparatus for use in combination with a nuclear-resonance magnetometer of the type including a radio frequency oscillator tunable to nuclear-resonance frequencies of a sample when subjected to magnetic fields within a selected range and adapted to yield electric pulses when said sample is subjected to a cyclically varying magnetic field of relatively low intensity superposed on a magnetic field to be measured, comprising a two-phase servomotor adapted to have one phase connected to a supply alternating in synchronism with said cyclically varying field and a second phase winding, means for supplying said second phase winding with current varying in phase with the electric pulses from said magnetometer, means for mechanically connecting said servomotor to tune said oscillator, a source of radio frequency waves comprising a plurality of frequency components spaced at known intervals within the tuning range of said oscillator, intermodulating means connected to said source and adapted for connection to said oscillator, means for selecting from the modulation products of said intermodulating means a narrow band of low frequencies developed by the approach of the frequencies supplied by said oscillator to zero beat with components supplied by said source, and means responsive to such selected frequencies for developing an indicating pulse.

5. Apparatus as defined in claim 4 wherein said means responsive to selected frequencies comprises a rectifier supplied by said selected frequencies, a grid-glow tube, means for normally biasing said tube to cut-off, connections for applying rectified voltage from said rectifier to overcome said biasing means, a condenser connected across said grid-glow tube in series with a pulse-responsive registering means, and a high-resistance circuit for charging said condenser, whereby when the cut-off bias of said grid-glow tube is overcome said condenser discharges through said tube and registering means to actuate the latter.

References Cited in the file of this patent
UNITED STATES PATENTS 2,589,494  Hershberger _____ Mar. 18, 1952